United States Patent [19]

Floyd et al.

[11] 4,103,332
[45] Jul. 25, 1978

[54] MILE POST LOCATION DISPLAY SYSTEM

[75] Inventors: Robert D. Floyd, Dallas; Lee V. Gorman, Garland; David L. Thummel, Dallas, all of Tex.

[73] Assignee: David Floyd, Dallas, Tex.

[21] Appl. No.: 808,350

[22] Filed: Jun. 20, 1977

[51] Int. Cl.² ............................................. G06F 15/20
[52] U.S. Cl. ............................. 364/449; 235/92 DN; 235/95 B; 364/424; 364/460; 364/709
[58] Field of Search ............... 364/424, 449, 460, 708, 364/709, 561; 235/92 DN, 95 R, 95 B, 97; 116/28 R

[56] References Cited

U.S. PATENT DOCUMENTS

| | | | |
|---|---|---|---|
| 1,199,626 | 9/1916 | Smithey | 235/95 R |
| 1,314,285 | 8/1919 | Smithey | 235/95 R |
| 1,708,708 | 4/1929 | Tibbetts | 235/95 |
| 1,761,950 | 6/1930 | Zubaty | 235/95 R |
| 1,824,513 | 9/1931 | Tibbetts | 235/95 R |
| 2,551,656 | 5/1951 | Breitenstein | 235/92 |
| 2,634,914 | 4/1953 | Lyon | 235/95 |
| 3,571,933 | 3/1971 | Johnson | 33/142 |
| 3,614,617 | 10/1971 | Blake, Jr. | 324/166 |
| 3,746,985 | 7/1973 | Perron | 324/166 |
| 3,898,437 | 8/1975 | Butler | 235/95 R |
| 4,068,307 | 1/1978 | Floyd et al. | 364/424 |
| 4,068,308 | 1/1978 | Opper | 364/449 |

*Primary Examiner*—Malcolm A. Morrison
*Assistant Examiner*—Errol A. Krass
*Attorney, Agent, or Firm*—Richards, Harris & Medlock

[57] ABSTRACT

The specification discloses a mile post location system which can be adjusted in accordance with a particular vehicle having a citizens band radio. The system includes circuitry for generating a distance signal in response to rotation of a wheel of the vehicle. Switches are accessible to the vehicle operator for generating a predetermined reference signal dependent upon the diameter of a tire of the vehicle and being representative of a predetermined distance traveled by the vehicle. The system further includes electronic circuitry for comparing the distance signal with the reference signal and for generating an output signal representing the predetermined distance traveled by the vehicle when the distance signal equals the reference signal. A mileage setting device is accessible to the vehicle operator and includes numerical digit keys operable for generating input signals representative of an initial mile post designation to a calculator circuit. The calculator circuit is responsive to the input signals and the comparator electrical output signals for performing arithmetic calculations on the signals and for generating an electrical output signal representing the position of the vehicle relative to subsequent mile post designations. A display is coupled to the calculator circuit for visually displaying the output signal generated by the calculator circuit.

12 Claims, 3 Drawing Figures

MILE POST LOCATION DISPLAY SYSTEM

RELATED APPLICATIONS

This application is an improvement of application Ser. No. 683,759, filed May 6, 1976, and entitled "Mile Post Location Display System", now U.S. Pat. No. 4,068,307, issued Jan. 10, 1978.

FIELD OF THE INVENTION

This invention relates to location systems, and more particularly relates to an improved location display system for indicating the relative position of a vehicle to mile post markers on a highway.

THE PRIOR ART

Citizens band radios are commonly used in a large number of vehicles. Such radios are used by the vehicle operators to report accidents along the highway and to provide communications between vehicles regarding weather conditions, road conditions and the like. When reporting accidents or other conditions along a highway, it is important that the citizens band radio operator be able to specifically identify a particular location along the highway. A common technique for providing such a location identification is by identifying the closest mile post marker, such markers being located at periodic intervals along many highways. These mile post markers are each provided with a unique identifying number and may be spaced apart by quarter mile or mile intervals.

In the past, to know a particular location, vehicle operators have been required to remember the number of the mile post marker just passed by the vehicle or the operators have had to wait until the next mile post marker is past. In addition, the vehicle operator has been required to remember whether or not the numbers on the mile post markers are incrementing or decrementing in order to provide an accurate identification of the vehicle location. Because of these requirements on the vehicle operator, mile post markers have not been completely satisfactory as a method for providing location information and erroneous and delayed location information has thus sometimes resulted from use of such markers.

U.S. patent application Ser. No. 683,759 now U.S. Pat. No. 4,068,307 describes a mile post location display system to enable a vehicle operator to have a continuous display of the vehicle's location with respect to the nearest mile post marker. However, it has been found that the system cannot be standardized to provide accurate readouts for all vehicles having various wheel sizes and the like. Consequently, a need has arisen for such a mile post location display system which can be adjusted to provide greater accuracy as to the vehicle's location with respect to the nearest mile post marker. A need has further arisen for a mile post location display system which can be easily installed in the vehicle by the vehicle operator and which can be easily calibrated according to the diameter of the tires of the vehicle.

SUMMARY OF THE INVENTION

In accordance with the present invention, a mile post location system having improved distance measurement accuracy includes circuitry for generating a distance signal in response to rotation of a wheel of the vehicle. Switches are accessible to the vehicle operator for generating a predetermined reference signal dependent upon the diameter of a tire of the vehicle and being representative of a predetermined distance traveled by the vehicle. The system further includes circuitry for comparing the distance signal with the reference signal and for generating an output signal representing the predetermined distance traveled by the vehicle when the distance signal equals the reference signal. Mileage setting switches are accessible to the vehicle operator and include numerical digit keys operable for generating input signals representative of an initial mile post designation to a calculator circuit. The calculator circuit is responsive to the input signals and the comparator electrical output signal for performing arithmetic calculations on the signals and for generating an electrical output signal representing the position of the vehicle relative to subsequent mile post designations. A display is coupled to the calculator circuit for visually displaying to the vehicle operator the output signal generated by the calculator circuit.

DESCRIPTION OF THE DRAWINGS

For a more complete understanding of the present invention and for further objects and advantages thereof, reference is now made to the following description, taken in conjunction with the accompanying drawings, in which.

DESCRIPTION OF THE PREFERRED EMBODIMENT

Figure 1:
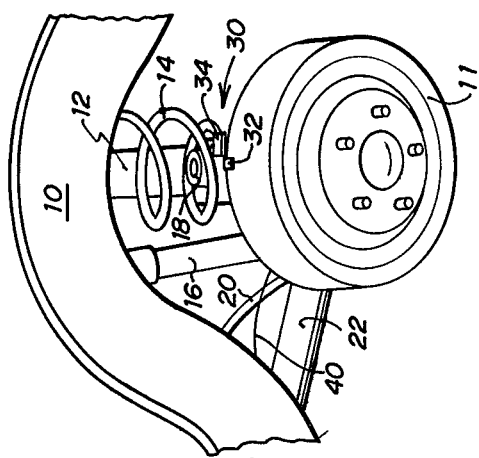
FIGS. 1 and 2 are prospective views of a vehicle's rear axle and brake drum assembly, illustrating the connection of a magnetic transducer in accordance with the present invention.
Figure 2:
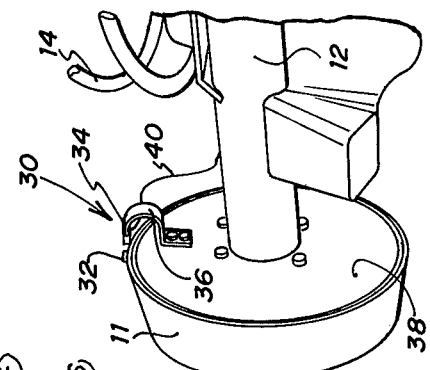

Referring simultaneously to FIGS. 1 and 2, a rear wheel brake drum of a vehicle 10 is illustrated wherein like numerals are utilized for like and corresponding elements. A brake drum 11 is shown interconnected to rear axle 12 of the vehicle 10 having a spring 14 and shock absorber 16. Further illustrated in a bumper 18, hydraulic brake line 20 and leaf springs 22.

The transducer of the present invention is generally identified by the numeral 30 and may comprise any one of a number of conventional magnetic transducers well known in the art. A magnet 32 is rigidly affixed to the brake drum 11 such as by welding or the like for rotation therewith. A magnetic sensor 34 is rigidly affixed to a mounting bracket 36, which in turn is rigidly affixed to a backing plate 38 of the brake drum 11. The magnetic sensor 34 is operable to generate a pulse in response to the magnetic field of the magnet 32 as the magnet 32 rotates past the sensor 34 upon each rotation of the brake drum 11. The pulses generated by the magnetic sensor 34 are carried along cable 40 to the input circuitry of the display system, which may be located adjacent the vehicle dashboard for convenient access by the vehicle operator. The magnetic transducer 30 can be quickly and easily installed by the vehicle operator to the brake drum 11 and backing plate 38 by removal of a rear vehicle tire. The cable 40 can be interlaced and positioned adjacent existing electrical cables extending from the vehicle dashboard to rear brake lights and turn signal indicators.

Figure 3:
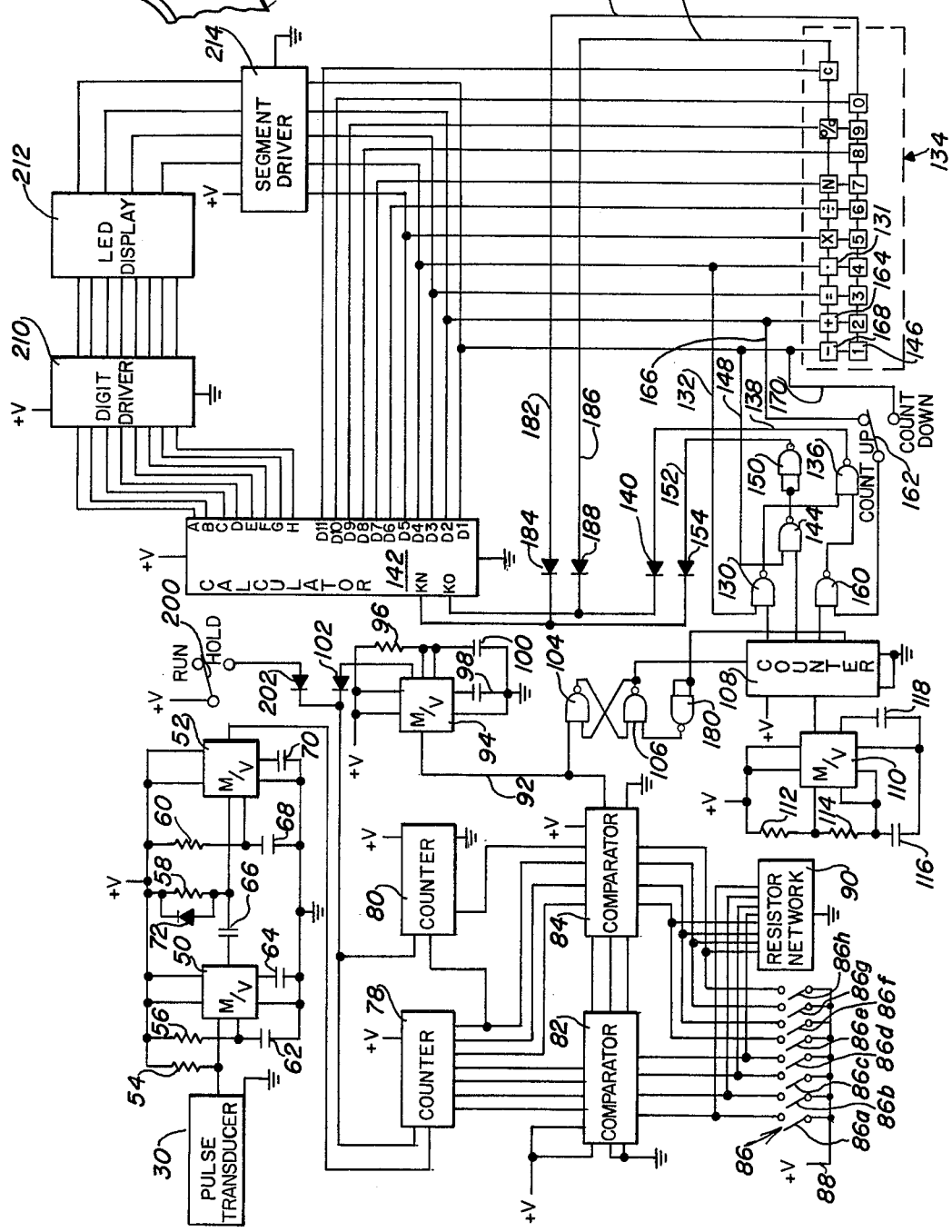
FIG. 3 is a detailed schematic diagram of the electronic circuitry of the present system.

Referring to FIG. 3, the electronic circuitry of the present invention is illustrated. The pulse transducer 30 produces a pulse upon each rotation of the brake drum 11 due to the passage of the magnet 32 under the magnetic sensor 34. Each pulse generated by the pulse transducer 30 is applied to a multivibrator 50, which is interconnected to a multivibrator 52. Multivibrators 50 and 52 function in a nonoscillating state or one shot mode of operation due to the selection of appropriate values for resistors 54, 56, 58 and 60, and capacitors 62, 64, 66, 68 and 70 and diode 72. Multivibrators 50 and 52 may comprise, for example, NE 555 I/Cs. Multivibrators 50 and 52 function to double buffer the input signal from the pulse transducer 30 to provide a clean input signal to counters 78 and 80. Multivibrators 50 and 52 therefore function to filter out the portion of the pulses generated by the pulse transducer 30 containing signals representing the arcing between the magnetic contact 30 and magnetic sensor 34 which occurs as the magnetic contact 32 passes beneath the magnetic sensor 34 (FIGS. 1 and 2).

As previously stated the output of multivibrator 52 is applied to counters 78 and 80, which are BCD decade counters. Counters 78 and 80 may comprise, for example, CD 4024 I/Cs. The output of counters 78 and 80 or the summation of pulses counted is applied in parallel to comparators 82 and 84. Comparators 82 and 84 offer comparisons to determine the equality between two binary words. The first word is supplied by counters 78 and 80, and the second binary word is supplied through the closure of one or more switches identified generally by the numeral 86. Comparators 82 and 84 may comprise, for example, CD 4063 I/Cs.

An important aspect of the present invention is the use of switches 86, which may comprise thumb wheel or toggle switches, to enable the vehicle operator to calibrate the present mile post location system according to the particular diameter of the tires of the vehicle, thereby resulting in improved mileage measurement. The closure of one or more of switches 86a-86h inputs a reference signal in the form of a binary coded decimal word to the comparators 82 and 84. In the preferred embodiment the reference signal represents a distance corresponding to one tenth of a mile traveled by the vehicle having a particular diameter tire. In this manner, the vehicle operator can program the mile post location display system of the present invention according to the diameter of a tire of the vehicle by simply presetting predetermined ones of the switches 86a-86h. A voltage is applied along line 88 when either of the switches 86a-86h is closed to apply this voltage to comparators 82 and 84. When a switch 86a-86h is in the open position, a ground reference voltage will be applied to the inputs of comparators 82 and 84 through a resistor network 90.

When the required number of pulses from the pulse transducer 30 are counted by counters 78 and 80 to equal the reference number applied to comparators 82 and 84 through the switches 86, the comparator 84 will generate an output along signal line 92. This output represents that the vehicle has traveled one tenth of a mile. The output along signal line 92 is applied to a multivibrator 94, which functions in the one shot mode due to the appropriate selection for values of resistor 96 and capacitors 98 and 100 and diode 102. Multivibrator 94 may comprise, for example, an NE 555 I/C. The output of multivibrator 92 is applied to counters 78 and 80. This output resets counters 78 and 80 at the end of each tenth mile traveled by the vehicle to enable counters 78 and 80 to begin counting for each subsequent tenth mile interval traveled by the vehicle.

The output of comparator 84 is also applied along signal line 92 to a NAND gate 104 which is interconnected to a NAND gate 106. The output of NAND gate 106 is an enable pulse for a counter 108, which may comprise, for example, a CD 4017 I/C. Counter 108 is driven by a multivibrator 110, which functions as an oscillator due to the selection of appropriate values for resistors 112 and 114 and capacitors 116 and 118. Multivibrator 110 may comprise, for example, an NE 555 I/C.

Counter 108 is cycled through four steps by the multivibrator 110. Upon receiving the enable pulse from NAND gate 106, counter 108 will apply an output to NAND gate 130. NAND gate 130 also receives an input from the decimal key 131 along signal line 132 from the keyboard generally identified by the numeral 134. The output of NAND gate 130 is applied to a NAND gate 136, whose output is applied along signal line 138 through a diode 140 to the KO input of an arithmetic calculator chip 142. The first step of the counter 108 sequence inputs a decimal command into the calculator chip 142. The calculator chip 142 may comprise a 1-chip calculator unit that is internally programmed by the manufacturer, for example, model TMS 1802 manufactured by Texas Instruments, Incorporated. The keyboard 134 may comprise a keyboard manufactured by Bowmar, for example, model MP805483.

On the second step of the counter 108 sequence, an output is applied to NAND gate 144, which also receives an input from the numeral 1 key 146 of the keyboard 134 along signal line 148. The output of NAND gate 144 is applied to a NAND gate 150, whose output is applied along signal line 152 through a diode 154 to the KN input of calculator chip 142. At the end of the second step of the counter 108 sequence the numeral .1 will have been input into the calculator chip 142.

On the third step of the counter 108 sequence, the output of counter 108 is applied to NAND gate 160. NAND gate 160 also receives an input through a countup/countdown switch 162. The switch 162 is accessible to the vehicle operator and is positionable to indicate whether the mile post designations are increasing or decreasing in magnitude as the vehicle travels along a highway. With the switch 162 positioned in the countup mode as illustrated in FIG. 3, the addition command signal is applied from the key 164 along signal line 166 to NAND gate 160. Alternatively, if the mile post markers are decreasing in magnitude, the switch 162 is positioned in the countdown mode to apply the output signal from the minus key 168 along signal line 170 to NAND gate 160. The output of NAND gate 160 is applied through NAND gate 136 to the command signal input KO of the calculator chip 142.

On the fourth step of the counter 108 sequence, the output of counter 108 is applied to a NAND gate 180 whose output is applied to NAND gate 106 to reset counter 108. The overall effect of the four steps of the counter 108 sequence is to input to the calculator chip 142 the numeral .1 after each tenth mile traveled by the vehicle and to also input the command established by the position of switch 162 as to whether the numeral .1 is to be added to or subtracted from the numeral previously stored within the calculator chip 142.

To initially input a mile post designation to the calculator chip 148, the vehicle operator will depress the numeric function keys associated with the keyboard 134 to apply an output along signal line 182 through a diode 184 to the KN input to the calculator chip 142. The additional command functions, multiplication, division, percent and clear signals, can be input to the calculator chip 142 along signal line 186 through a diode 188 to the KO input of the calculator chip 142. These additional command functions and the use of the calculator independent of the mile post display system can be accomplished using a switch 200 positioned in the hold mode. Switch 200 in the hold position applies a voltage through a diode 202 to prevent counters 78 and 80 from counting the pulses input from the multivibrator 52. In the run position, as shown in FIG. 3, switch 200 removes the clear from the counters 78 and 80 and allows counters 78 and 80 to begin counting.

The operation of the calculator chip 142 is well known in the art and is further described in the co-pending application Ser. No. 683,759 now U.S. Pat. No. 4,068,307. The calculator chip 142 strobes the signal lines D1-D11 to apply a voltage to the keys of the keyboard 134. Upon depression of one of the keys of the keyboard 134 this voltage is applied to the KO or KN inputs to the calculator chip 142. The output of the calculator chip 142 also strobes a digit driver 210 along signal lines A-H. Digit driver 200 is interconnected to a light emitting diode display 212 which is interconnected to a light emitting diode segment driver 214. Digit driver 210, LED display 212 and segment driver 214 operate in a manner well known in the art and is further explained in the co-pending application Ser. No. 683,759.

It can therefore be seen that the present invention provides an improved mile post location display system having greater accuracy in determining distance traveled by a vehicle. In addition, the present mile post location display system is easy to install and operate by the vehicle operator.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A location display system for a vehicle comprising:
    means for generating a distance signal representative of rotation of a wheel of the vehicle;
    switch means accessible to the vehicle operator for generating a predetermined reference signal dependent upon the diameter of a tire of the vehicle and being representative of a predetermined distance traveled by the vehicle;
    comparator means for comparing said distance signal with said reference signal and for generating an output signal representing said predetermined distance traveled by the vehicle when said distance signal equals said reference signal;
    mileage setting means accessible to the vehicle operator and including numerical digit keys operable for generating input signals representative of an initial mile post designation;
    calculator means responsive to said input signals and said comparator output signal for performing arithmetic calculations on said signals and for generating an electrical output signal representing the position of the vehicle relative to subsequent mile post designations; and
    display means coupled to said calculator means for visually displaying to the vehicle operator said electrical output signal generated by said calculator means.

2. The location display system of claim 1 wherein said means for generating a distance signal in response to rotation of a wheel of the vehicle comprises:
    transducer means for generating electrical output pulses such that a pulse is generated in response to a single rotation of the wheel of the vehicle; and
    means for summing said transducer output pulses.

3. The location display system of claim 2 wherein said transducer means comprises:
    a magnetic contact mounted to the brake drum of the wheel of the vehicle for rotation therewith; and
    a magnetic sensor rigidly mounted to the brake drum housing of the wheel of the vehicle to generate said electrical output pulses when said magnetic contact rotates past and in proximity to said magnetic contact.

4. The location display system of claim 3 wherein said transducer means further includes:
    a mounting bracket having first and second ends and a curved central portion interconnecting said ends;
    said magnetic sensor being mounted to said first end of said bracket; and
    said second end of said bracket being rigidly mounted to the brake drum housing, such that said curved central portion of said bracket extends above said brake drum to align said first end with said magnetic contact.

5. The location display system of claim 1 and further including:
    function switch means accessible to the vehicle operator for generating mile incrementing or decrementing instruction input signals to said calculator means.

6. The location display system of claim 1 wherein said display means for visually displaying said output signal generated by said calculator means comprises an array of light emitting diodes.

7. The location display system of claim 6 wherein said calculator means arithmetically adds said input signals and said comparator output signal.

8. The location display system of claim 6 wherein said calculator means arithmetically subtracts said comparator output signal from said input signals.

9. A mile post location display system for a vehicle comprising:
    computing circuit means;
    input means connected to said computing circuit means for entering digits of numbers representing an initial mile post designation and incrementing or decrementing commands into said computing circuit means;
    switch means accessible to the vehicle operator for generating a predetermined reference signal dependent upon the diameter of a tire of the vehicle, said predetermined reference signal being representative of a predetermined fraction of a mile traveled by the vehicle;
    transducer means for generating electrical output pulses with represent rotation of the wheel of the vehicle;
    means for summing said transducer output pulses and for generating a summation signal;
    comparator means for comparing said summation signal with said predetermined reference signal and for generating an output signal representing said predetermined fraction of a mile traveled by the vehicle when said summation signal equals said reference signal and for entering said output signal into said computing circuit means;

said computing circuit means incrementing or decrementing said initial mile post designation in response to said comparator output signal to generate an output signal representing the location of the vehicle with respect to subsequent mile posts; and means for visually displaying to the vehicle operator said output signal generated by said computing circuit means.

10. The mile post location display system of claim 9 wherein said input means connected to said computing circuit means comprises:

a keyboard for entering digits of numbers representing an initial mile post designation; and switch means to input incrementing or decrementing commands to said computing circuit means.

11. The mile post location display system of claim 9 wherein said transducer means comprises:

a magnetic contact mounted to the brake drum of the wheel of the vehicle for rotation therewith; and a magnetic sensor rigidly mounted to the brake drum housing of the wheel of the vehicle to generate said electrical output pulses when said magnetic contact rotates past and in proximity to said magnetic contact.

12. A mile post location display system for a vehicle comprising:

a magnetic contact mounted to the brake drum of the wheel of the vehicle for rotation therewith;

a mounting bracket having first and second ends and a curved central portion interconnecting said ends;

a magnetic sensor mounted to said first end of said bracket for generating pulses with represent rotation of the wheel of the vehicle;

said second end of said bracket being rigidly mounted to the brake drum housing of the wheel of the vehicle, such that said curved central portion of said bracket extends above said brake drum to align said first end with said magnetic contact;

switch means for generating a predetermined reference signal dependent upon the diameter of a tire of the vehicle and being representative of a predetermined distance traveled by the vehicle;

comparator means for comparing said magnetic sensor generated pulses with said reference signal and for generating an output signal representing said predetermined distance traveled by the vehicle when said magnetic sensor generated pulses equal said reference signal;

milege setting means for generating input signals representative of an initial mile post designation;

calculator means responsive to said input signals and said comparator output signal for generating an electrical output signal representing the position of the vehicle relative to subsequent mile post designations; and display means coupled to said calculator means for visually displaying to the vehicle operator said electrical output signal generated by said calculator means.

* * * * *